Aug. 9, 1960     M. A. COUFLEAU     2,948,846
WELL LOGGING SYSTEMS
Filed Nov. 1, 1956     2 Sheets-Sheet 1

INVENTOR.
Maurice A. Coufleau
BY
William P. Sherman
His Attorney.

Aug. 9, 1960  M. A. COUFLEAU  2,948,846
WELL LOGGING SYSTEMS
Filed Nov. 1, 1956  2 Sheets-Sheet 2
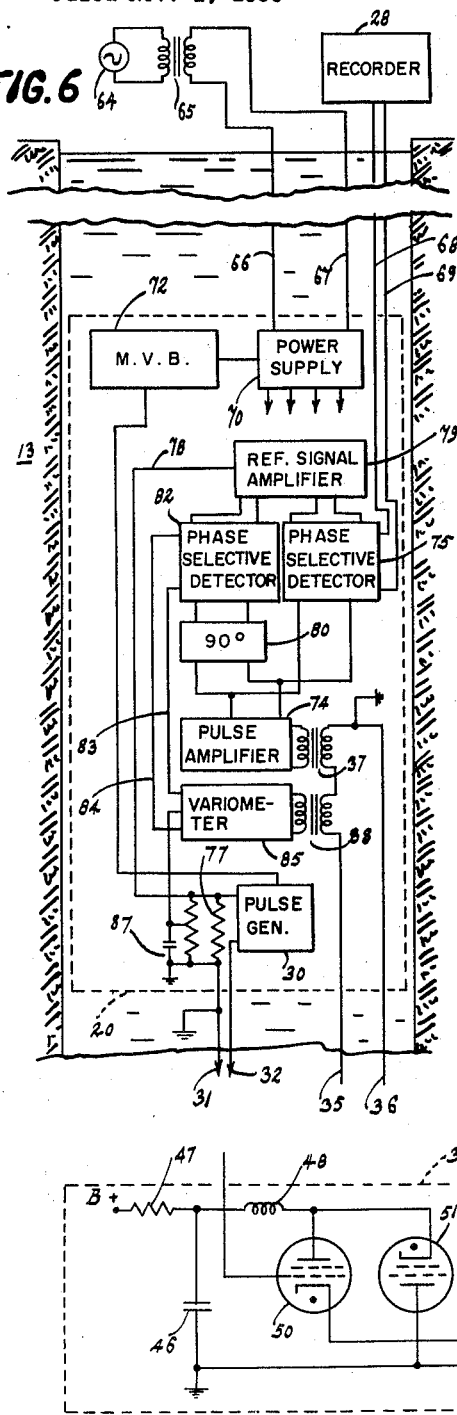
FIG.6
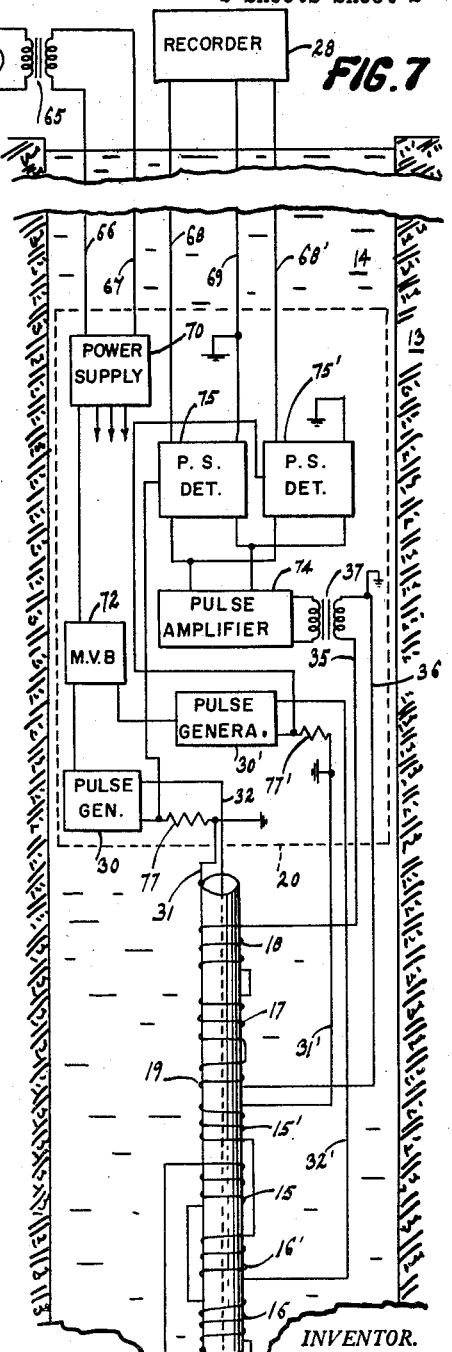
FIG.7
FIG.2
INVENTOR.
Maurice A. Coufleau
BY
William R. Sherman
His Attorney

United States Patent Office 2,948,846
Patented Aug. 9, 1960

2,948,846

WELL LOGGING SYSTEMS

Maurice A. Coufleau, Ridgefield, Conn., assignor, by mesne assignments, to Schlumberger Well Surveying Corporation, Houston, Tex., a corporation of Texas Filed Nov. 1, 1956, Ser. No. 619,900

15 Claims. (Cl. 324—6)

The present invention relates to systems for investigating earth formations traversed by a borehole and more particularly to electromagnetic well logging systems for deriving indications of the conductivity of earth formations.

Widespread use is currently made of induction logging systems to determine the electrical conductivity of earth formations traversed by a well by passing through the well a coil system comprising alternating current energized transmitter coil means disposed in fixed relation to receive coil means for inductive coupling therewith, and deriving a signal component in the output of the receiver coil means that has the same phase as the energizing current. Such systems are rendered highly effective in the accurate determination of formation conductivities by the employment of focusing coil techniques of the type disclosed in Patents Nos. 2,582,314 for "Electromagnetic Well Logging System" and 2,582,315 for "Differential Coil System for Induction Logging," both issued January 15, 1952, to Henri-Georges Doll. In such systems, electronic equipment is commonly lowered in the borehole with the coil arrangement for amplifying and detecting the conductive component of the induced signal so that a detected signal may readily be transmitted to the surface for continuous, accurate indications of formation conductivity or resistivity. Where the detected signal results from continuous energization of the transmitter coil means during the course of a logging run, the indications obtained may include a slight amount of zero drift. In practice, such systems have been characterized by a single transmitter-receiver coil spacing although, in some instances, it would be desirable to employ multiple coil spacings to derive further information in accordance with different investigation characteristics.

It is an object of the present invention, accordingly, to provide new and improved induction well logging methods and apparatus of the above character for deriving indications which are substantially free from zero drift.

Another object of the invention is to provide new and improved induction well logging methods and apparatus of the foregoing character which provide substantially simultaneous indications of formation conductivity in accordance with different investigation characteristics.

A further object of this invention is to provide new and improved induction well logging methods and apparatus of the foregoing character in which power transmitted to subsurface equipment is efficiently employed to derive conductivity indications at the surface.

In accordance with the present invention, a transmitter coil in an induction well logging system is energized by pulses of current to induce in a receiver coil a pulse signal having a conductive component dependent upon the conductivity of surrounding formations and a reactive component. From the conductive component is derived a measure signal for transmission to the surface where the formation conductivity represented by the measure signal may be indicated.

In one form of the invention, response to the reactive component is minimized by amplifying the induced pulse signal over an interval when the reactive component is substantially zero. This interval is determined by the transition of the potential applied to the transmitter coil through zero. In a modification, the interval is determined by the transistion through zero of a signal induced in a coil inductively coupled with the transmitter coil. In another embodiment, feedback means are provided for rejecting the reactive component of the induced pulse signal. In yet another embodiment, provision is made for deriving conductivity indications in accordance with more than one transmitter-receiver coil spacing.

For a better understanding of the invention, reference is made to the following detailed description of several representative embodiments, taken in conjunction with the accompanying drawings in which:

Fig. 2 is a circuit diagram of the pulse generator of Fig. 1;

Fig. 6 is a schematic diagram of induction logging apparatus in accordance with another embodiment of the invention; and Fig. 7 is a schematic diagram of induction logging apparatus in accordance with yet another embodiment of the invention wherein multiple transmitter-receiver coil spacings are employed.

Figure 1:
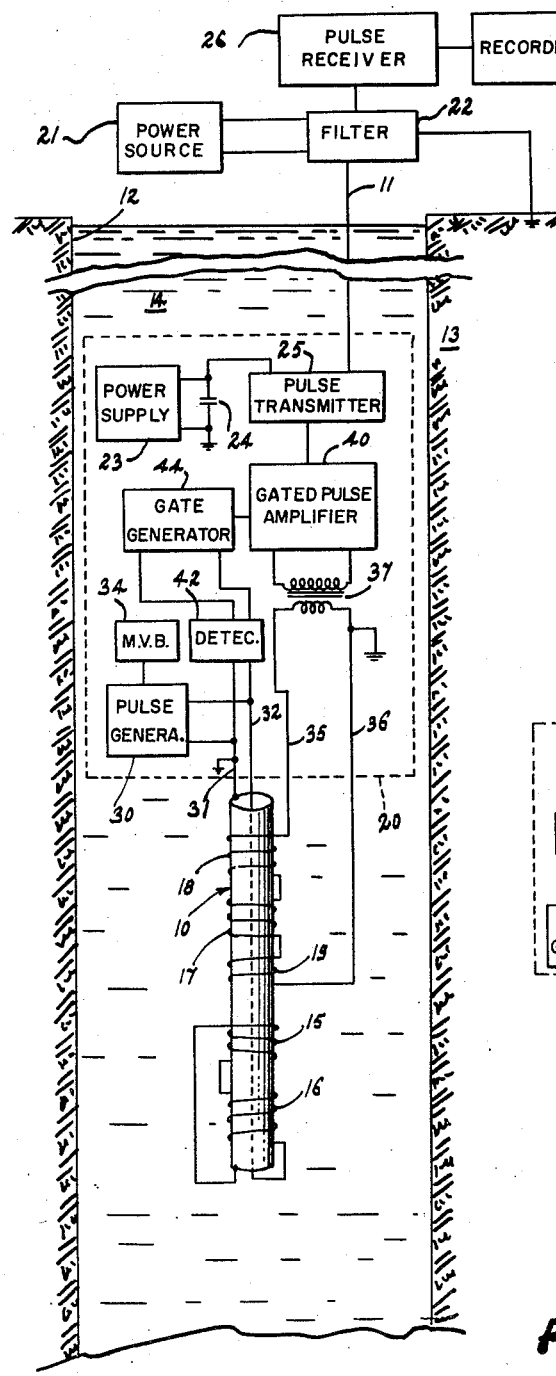
Fig. 1 is a schematic diagram of induction logging apparatus in accordance with the invention.

In Fig. 1 a typical induction logging array 10 is shown suspended by means of a conventional electrical monocable 11 in a borehole 12 traversing earth formations 13. The borehole 12 may be dry or it may contain relatively conductive or non-conductive drilling fluid 14. The induction logging array may suitably comprise a non-conductive, non-magnetic housing on which is wound a plurality of electrostatically shielded coils including, for example, a main transmitter coil 15, a transmitter focusing coil 16 therebelow, a receiver coil 17 above the main transmitter coil, a receiver focusing coil 18 thereabove, and also a compensating coil 19 intermediate the main receiver and transmitter coils 15 and 17. These coils may be arranged in fixed spacings, as described in the above-mentioned patents to Henri-Georges Doll, to form a coil assembly with an approximately zero mutual inductance. Electrically and physically connected to the coil assembly is a pressure-resistant cartridge which may contain the borehole portions of the electrical equipment used in the operation of the logging system.

Power may be transmitted to the subsurface apparatus from a conventional D.-C. power source 21 directly coupled through a suitable filter 22 at the surface with the cable 11 and connected by the cable 11 with a power supply 23 in the cartridge 20. A capacitor 24 is connected across the input terminals of the power supply to by-pass the measure signal which is supplied from the subsurface apparatus to the surface equipment for recording. A suitable transmission link for the measure signal is provided by a pulse transmitter 25 in the cartridge 20 and a pulse receiver 26 at the surface reactively coupled to the cable through filter 22, the output of the pulse receiver 26 being applied to a channel of a suitable recorder 28. Recorder 28 may, for example, be a conventional multi-channel galvanometric recorder of the type commonly employed in well logging apparatus or it may, for example, be a tape recorder, depending upon the form in which the measure signal is applied and the purpose for which it is to be used.

Within the subsurface cartridge 20 is a pulse generator 30 having its output coupled by conductors 31, 32 to the transmitter coils 15, 16 in series. The conductors 31, 32 may be coaxial along the length which extends through the coil array, as illustrated. A multivibrator 34, which may, for example, be of the free running type, is coupled with the pulse generator 30 to energize it periodically at a given rate for the production of time-spaced pulses.

The receiver coils 17, 18 and the compensating coil 19 are connected in series by insulated conductors 35, 36 across the primary winding of transformer 37. Transformer 37 serves to couple the pulse signal induced in the series connected coils 17–19 to the input terminals of a gated pulse amplifier 40. The pulse amplifier 40, which may be of any suitable design, has its output coupled to the pulse transmitter 25 to supply a version of the measure signal for transmission to the surface.

Because there will generally be induced in the receiver coils a pulse signal having both a conductive component varying with the conductivity of surrounding earth formations and also a reactive component, provision is made for making the measure signal largely reflective of the value of the conductive component. To this end, a detector 42 may be coupled across the output of pulse generator 30 for producing a relatively sharp pulse as the potential supplied by the pulse generator 30 has a transition through a zero value. This detected pulse is applied to the energizing circuit of a gate generator 44 to produce a gate signal or rectangular pulse of desired duration. This gate signal is, in turn, applied to the gated pulse amplifier 40 to render it operative during the duration of the rectangular pulse. Thus, a stage of the gated pulse amplifier 40, such as the last stage, may have a control element biased to cut-off but driven to a potential producing conduction when the gate signal is applied to the control element.

Figure 4:
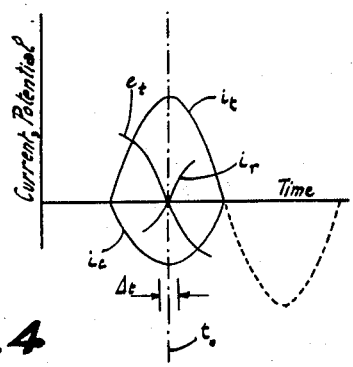
Fig. 4 is a graphical representation of signal variations in the apparatus of Fig. 1.

Although the pulse of energizing current supplied to the transmitter coil array may have a variety of suitable wave shapes, its wave shape is conveniently, in accordance with the present invention, one-half a sine wave and of a given polarity. This wave form is represented in Fig. 4 graphically by the curve $i_t$, the dotted curve representing the negative half of the sine wave which is not applied to the transmitter coils. While the pulse generator may have a variety of designs producing the half-wave sinusoidal pulse $i_t$, one suitable design is shown in Fig. 2. A charging capacitor 46 has one terminal connected to the current return conductor 31 and the other terminal connected through a resistor 47 to the B+ terminal of the power supply. An inductor 48 serves to connect the junction of capacitor 46 and resistor 47 with a pair of thyratrons 50, 51 connected in back-to-back or oppositely poled relation. The inductor 48 and capacitor 46 together form a series circuit resonant at the frequency corresponding to the desired period of D.C. current pulse $i_t$. This frequency may, for example, be 20 kilocycles. The thyratron 50 has its anode connected to the inductor 48 and its cathode connected to conductor 32 so as to be conductive in the direction of discharge current derived from capacitor 46. To utilize the reactive energy stored in the inductor 48 for restoring the charge on capacitor 46, the other thyratron 51 has its anode connected to conductor 31 and its cathode connected to the inductor 48. At least the thyratron 50 is provided with a control grid which may be energized to initiate a pulse. For example, the multivibrator 34 may be arranged to supply triggering pulses to the control grid of thyratron 50 at a 60 cycle rate or at another rate, as desired.

Figure 3:
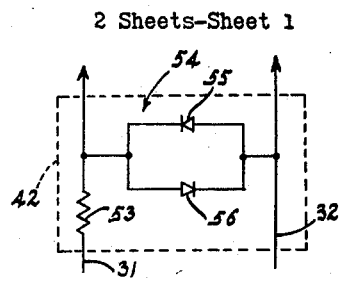
Fig. 3 is a circuit diagram of the detector of Fig. 1.

It will be appreciated that the potential $e_t$ across the transmitter coils supplied by the pulse generator is substatially in leading phase quadrature relation with a current pulse $i_t$ and may be graphically represented by the curve $e_t$ of Fig. 4. While the detector 42 may have a variety of suitable designs for detecting the zero crossing of the potential curve $e_t$, a convenient form is represented in Fig. 3. Thus, there may be connected between the conductors 31, 32 a linear resistor 53 and a non-linear impedance 54 together forming a potential divider. The gate generator 44 is connected across the non-linear impedance 54. The non-linear impedance 54 may comprise diodes 55, 56 connected in parallel, back-to-back or oppositely poled relation, these diodes being, for example, of the silicon type.

In an exemplary operation of the apparatus of Figs. 1–3, the coil assembly 10 and cartridge 20 are moved through the borehole past formations to be investigated while the record of recorder 28 is correspondingly advanced. Pulse generator 30 is energized by the multivibrator 34 at a suitable rate related to the speed of travel of the coil assembly, such that the conductivity of the adjacent formation is sampled on the order of several times, for example, for each foot of travel. The frequency of the pulse supplied by the pulse generator 30 is, however, relatively high for efficiency of transmitting energy into the formations. The peak power of the pulses applied to the transmitter coils 15, 16 may be large relative to the power applied continuously in accordance with the previous practice.

The pulse of transmitter coil current $i_t$ induces in the adjacent formations a current circulating the borehole and in phase quadrature with the transmitter current. This circulating earth current, in turn, induces in the receiver coil array a pulse of current also of substantially sinusoidal wave shape and again in phase quadrature. Since the magnitude of the circulating earth current depends upon the conductivity of the formations along its annular path, the component of receiver coil current which it induces is representative of the conductivity of the earth formations and is hence referred to as the conductive component $i_c$. At the time there is induced in the receiver coil array a reactive component $i_r$ of impulse current which arises from a residual mutual coupling between the transmitter and receiver coil arrays and is, as represented in Fig. 4, in phase quadrature with the conductive component $i_c$.

Both components of the receiver coil current are applied to the pulse amplifier 40. If the reactive component $i_r$ were of negligible value relative to the conductive component, the conductive component could simply be amplified and transmitted to the surface in suitable form for recording. However, the reactive component will frequently be of subtsantial magnitude and, in fact, often greater than the conductive component, especially opposite formations of relatively low conductivity. So that the measure signal may predominantly reflect the value of the conductive component, the pulse amplifier 40 is arranged, in accordance with the invention, to amplify the conductive component over an interval of time when the average value of the reactive component is substantially zero.

Referring to Fig. 4, the instant at which the reactive component of current $i_r$ passes through a zero value may be referred to as the time $t_0$. In an interval $\Delta t$ centered with respect to the time $t_0$ and representing a fraction of the half-wave period, the average value of the reactive component $i_r$ is zero. On the other hand, the average value of the conductive component $i_c$ during the same time interval $\Delta t$ is substantially equal to the peak value of the conductive component. Provision is, therefore, made for gating the pulse amplifier 40 to amplify the current pulse induced in the receiver coil array only during the time interval $\Delta t$ when the reactive component is a minimum and the conductive component is a maximum. It may be noted that the potential $e_t$ applied to the transmitter coil array has a transition through zero substantially at the same instant $t_0$ that the reactive current component $i_r$ is zero. Gating of the pulse amplifier 40 is therefore conveniently made dependent upon the detected transition of the transmitter coil potential $e_t$ through zero.

If an adjustment of the gating of the pulse amplifier 40 is necessary to minimize response to the reactive component $i_r$ of the induced current pulse, such adjustment may be effected, for example, either by introducing a suitable bias potential in series with non-linear impedance 54 or by the use of delay networks, as desired. It may be noted that the pulse generator 30 supplies only a unidirectional pulse signal, the capacitor 46 being recharged by a pulse of opposite polarity circulated internally of the pulse generator by the thyratron 51. By this arrangement, a minimum charging current is required from the power supply for most efficient use of power transmitted through the cable to the subsurface apparatus. If desired, however, the charging pulse may also be circulated through the transmitter coils by connecting the anode of thyratron 51 to conductor 32.

During the time interval $\Delta t$, an amplified version of the received pulse signal is supplied to the pulse transmitter 25 for transmission to the surface. Intermediate the time intervals $\Delta t$, however, no signal is derived from the pulse amplifier and consequently the signal transmitted to the surface will represent the reference or zero value of the measure signal. By relating the value of the measure signal during on periods of the pulse amplifier with the reference signal during off periods, the recorded or indicated values of formation conductivity are rendered independent of any zero drift in the course of a logging operation. At the same time the transmission link through the cable may be utilized during off periods of pulse amplifier 40 for transmission of other information to the surface, if desired.

Figure 5:
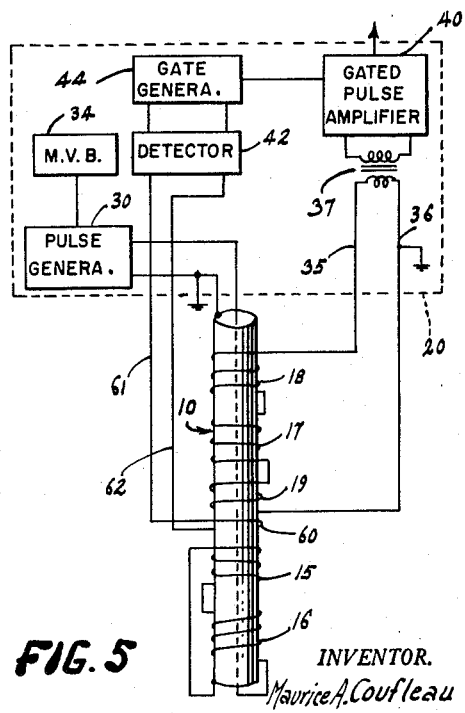
Fig. 5 is a schematic diagram of induction logging apparatus in accordance with a modification of the invention.

In a modification of the apparatus of Fig. 1, gating of the pulse amplifier 40 is determined by transition through zero of a potential induced by the energization of the transmitter coil. As illustrated in Fig. 5, a coil 60 is supported along the coil assembly 10 in inductively coupled relation with the transmitter coil 15. Preferably, the coil 60 is relatively non-responsive to induced current circulating in the formations surrounding the borehole and has a relatively high mutual inductance with respect to transmitter coil 15. Insulated conductors 61, 62 connect the coil 60 with the input terminals of the detector 42.

In a typical operation of the modification of Fig. 5, which is generally similar to operation of the apparatus of Figs. 1-3, the pulse of transmitter current traversing transmitter coils 15, 16 induces a potential in the coil 60, which is in phase with the current induced to circulate the formations surrounding the borehole, but in phase quadrature with the transmitter current. Because of this phase quadrature relationship, the potential induced in the coil 60 has a transition through zero at substantially the instant of time $t_0$. In some instances, a more accurate gating of the pulse amplifier 40 is afforded by this arrangement.

Another embodiment of the invention is illustrated in Fig. 6 wherein the coil assembly 10 is omitted for convenience of illustration. In this embodiment, power is derived from an A.C. source 64 at the surface coupled by transformer 65 with the upper terminals of cable conductors 66, 67. These conductors 66, 67 are made up by a multiconductor cable, with a pair of conductors 68, 69 provided for transmission of the measure signal. A suitable power supply 70 is disposed in the cartridge 20 and connected with the lower terminals of cable conductors 66, 67. Whereas the apparatus in Fig. 1 is arranged for operation with D.C. power, the power circuit of Fig. 6 is arranged to provide an A.C. timing wave, such as a 60 cycle wave, as well as rectified power, for utilization in the subsurface cartridge 20.

A multivibrator 72 is supplied with a timing wave from power supply 70 and serves to supply triggering pulses to the pulse generator 30 at a periodic rate determined by the timing wave. The output of the pulse generator 30 is again applied to the transmitter coils 15, 16.

The current pulses induced in the receiver coil array are coupled by conductors 35, 36 and transformer 37 to the input of a pulse amplifier 74. The pulse amplifier 74 applies an amplified version of the induced pulse signal to the input circuit of a phase sensitive detector 75, the output of which is coupled by cable conductors 68, 69 to the recorder 28. To provide a reference signal for polarizing the phase sensitive detector 75, there is connected in the transmitter coil circuit a series resistor 77, the ungrounded terminal of which is connected by conductor 78 to the input of a reference signal amplifier 79. A portion of the reference amplifier output is applied to the reference input of phase sensitive detector 75, this portion being in phase with the conductive component of the amplified pulse signal induced in the receiver coils.

In order to minimize the reactive component present in the induced pulse signal, the amplified version of the induced pulse signal is supplied to a phase shifting circuit 80 which induces a 90° phase shift in the reactive component to bring it in phase (or in phase opposition) with the output of the reference signal amplifier 79. The output of the phase shifting circuit is applied to the signal input of a phase sensitive detector 82, the output of the reference signal amplifier 79 being applied to the reference input of the phase sensitive detector 82. While the phase sensitive detectors 75 and 82 may have a variety of suitable designs, detector 75 preferably has an unbalanced output (one terminal grounded) and may be of the design in vol. 19 of the Radiation Laboratory Series entitled "Wave Forms," by Chance et al., at pages 522–523 (published in 1949 by McGraw-Hill Book Company, New York). Detector 82, on the other hand, preferably has a balanced output and may be of the type described at pages 254–255 of the "Review of Scientific Instruments," vol. 22, April 1951, in an article entitled "A Phase-Sensitive Dectector Circuit Having High Balanced Stability," by N. A. Schuster.

The balanced output of the phase sensitive detector 82 is supplied by conductors 83, 84 to the gain control input terminals of the variometer circuit 85. The signal input terminals of the variometer circuit are coupled by a phase-correcting, potential dividing network 87 across the series resistor 77 to render the variometer circuit responsive to a pulse signal in phase with the current pulses applied to the transmitter coils. The output of the variometer circuit 85 is supplied to transformer 88 having its secondary winding in series with the receiver coil circuit, the coupling being such that the variometer output is degenerative with respect to the reactive component of the induced pulse signal, that is, it tends to diminish the reactive component of the pulse signal induced in the receiver coils.

The variometer circuit 85 may be of the type disclosed in application Serial No. 750,307 for "Phase Rejection Networks," filed May 24, 1947, by Henri-Georges Doll, now U.S. Patent No. 2,788,483, and as described in application Serial No. 611,019, filed September 20, 1956, for "Electromagnetic Well Logging Systems," by W. J. Sloughter. In general, the variometer circuit provides an output signal, the magnitude of which varies with the amount of unbalance of the signal supplied by the reactive signal detector 82. The phase of the output signal is accurately maintained so that no false conductive signal is introduced by the variometer.

In an exemplary operation of the system of Fig. 6, the pulse generator 30 is triggered by the multivibrator 72 at a relatively low rate to produce a pulse having a relatively short period. This pulse is applied to the transmitter coils and induces a pulse signal in the receiver coils having both a conductive and a reactive component. Both components of the induced pulse signal are amplified, but the conductive component is selectively detected by detector 75 and transmitted by cable conductors 68, 69 to the surface for recording. To enhance the selectivity of the detector 75 by minimizing the reactive component, the phase shifting circuit 80, detector 82 and variometer 85 operate to diminish the reactive component at the input of the pulse amplifier.

Hence, the recorded measure signal reflects the value of the conductive component of the induced receiver coil current and therefore reflects the conductivity of the formations surrounding the borehole. At the same time, since the measure signal is characterized as a pulse train returning to a zero or reference level intermediate the periodically recurrent pulses, the recorded representation of the measure signal may be taken relative to the reference or zero value and therefore substantially free from any zero drift in the detector 75 occurring during a logging operation.

In other respects, the operation of the system of Fig. 6 is similar to that described for the system of Figs. 1–3.

Multiple transmitter-receiver coil spacings are incorporated in the embodiment of the invention illustrated in Fig. 7. In this embodiment, the multivibrator 72 not only triggers pulse generator 30 periodically but alternately triggers pulse generator 30', which may be similar in design to pulse generator 30. The multivibrator 72 may, for example, trigger one of the pulse generators during a positive going transition and trigger the other of the pulse generators during a negative going transition. As in the system of Fig. 6, the pulse generator 30 supplies a pulse of current to the transmitter coils 15, 16 the series resistor 77 being employed to develop a reference signal for application to the phase sensitive detector 75. The receiver coils are coupled in the same manner with the pulse amplifier 74, the output of which is applied to the phase sensitive detector 75 for developing a measure signal to be transmitted to the recorder 28. A reference signal amplifier and a network including the variometer circuit are not shown in this embodiment but may be included, if desired, in the manner described in connection with Fig. 6.

In alternation with the pulse generator 30, the pulse generator 30' supplies a current pulse to short-spacing transmitter coils 15' and 16' via insulated conductors 31', 32'. Conveniently, the short-spacing transmitter coil 15' may be spaced above the long-spacing transmitter coil 15 and, similarly, the focusing transmitter coil 16' may be spaced above the corresponding long-spacing coil 16. A series resistor 77' is included in the short-spacing transmitter coil circuit and serves to develop a reference signal for application to a phase sensitive detector 75' connected in parallel with detector 75 at the output of pulse amplifier 74. The output of detector 75' is coupled by cable conductor 68' to apply the short-spacing measure signal to another channel of recorder 28.

In a typical operation of the system of Fig. 7, the multivibrator 72 supplies triggering pulses alternately to the pulse generators 30 and 30'. When the pulse generator 30 is triggered, a current pulse is passed through the long-spacing transmitter coils 15, 16 to induce in the receiver coils a pulse signal having a conductive component representing formation conductivities in accordance with a relatively deep investigation characteristic. The conductive component is selectively detected by detector 75 which is then supplied with a reference pulse signal from the pulse generator 30. The detected version of the conductive component of the long-spacing receiver signal is thus supplied to a first channel of the recorder 28.

During alternate intervals, the pulse generator 30 is triggered to induce in the receiver coils a conductive component which represents a relatively shallow investigation characteristic. This conductive component attributable to the relatively short transmitter-receiver coil spacing is applied to the detector 75' in amplified form and a reference pulse signal is simultaneously applied to the reference input of the detector 75' by the pulse generator 30'. There is thus derived a detected version of the conductive component which is supplied to another channel of recorder 28 via conductor 68'. By suitably selecting the rate at which the pulse generators 30 and 30' are triggered, the conductivities of formations surrounding the borehole may be sampled sufficiently often during the traverse of the coil array past the formations that substantially continuous records of the short and long spacing signals may be obtained.

If desired, provision may be made for multiple sets of receiver coils as well as transmitter coils arrayed, for example, in the manner taught in A. Poupon application Serial No. 527,187, filed August 9, 1955, for "Induction Well Logging." The coupling of the receiver coils to a pulse amplifier is then conveniently synchronized with the application of pulses to the transmitter coils. Further, the circuitry for selective response to the conductive component of the induced pulse signal may be of the type represented in Fig. 1 rather than of the type utilizing a phase sensitive detector and variometer circuit.

Other modifications may be made in various embodiments of the invention. Thus, different arrangements and combinations of the transmitter and receiver coils may be made, such as a single transmitter coil and a single receiver coil, absent any focusing or compensating coils, or a single induction coil arranged, for example, as shown in Broding Patent No. 2,535,666, issued December 26, 1950. Provision may be made for obtaining indications of the resistivity of formations traversed by the logging array, as by computing the reciprocal of a measure signal, the signal varying with formation conductivity. In lieu of the thyratron 51 employed for conserving reactive power, an asymmetrically conductive device such as a diode may be employed. Accordingly, the invention is not to be limited to the illustrative embodiments but is of a scope defined in the appended claims.

I claim:

1. A method of investigating earth formations traversed by a borehole, comprising the steps of inducing a discontinuous sinusoidal current wave train portion to circulate about the borehole at successive depths through the surrounding earth formations, picking up a signal produced by induction of said circulating current at successive depths, and producing indications of formation conductivity at successive depths in selective response to a portion of said signal.

2. A method of investigating earth formations traversed by a borehole, comprising the steps of inducing a discontinuous half-wave sinusoidal pulse of current to circulate about the borehole at successive depths through the surrounding earth formations, picking up a signal produced by induction of said circulating current at successive depths and including a component in phase quadrature with said circulating current, and producing indications of formation conductivity at successive depths in selective response to said component of the signal.

3. In apparatus for investigating an electrical property of earth formations traversed by a borehole, the combination comprising an induction coil arranged for longitudinal movement through a borehole, means for passing a discontinuous sinusoidal current wave train portion through said induction coil to induce a signal having a conductive component dependent upon the conductivity of adjacent formations and a component out of phase with said conductive component, means responsive selectively to said conductive component for producing a measure signal varying as a function of electrical properties of adjacent formations, and means for transmitting said measure signal to the surface for utilization.

4. In apparatus for investigating an electrical property of earth formations traversed by a borehole, the combination comprising an induction coil arranged for movement longitudinally through a borehole, means for passing a discontinuous sinusoidal current wave train portion through said induction coil to induce a signal having a sinusoidal conductive component dependent upon the conductivity of adjacent formations and a component in phase quadrature with said conductive component, means responsive selectively to said conductive component for producing a measure signal varying as a function of formation conductivity, and means responsive to said measure signal for providing indications of formation conductivity.

5. In apparatus for investigating an electrical property of earth formations traversed by a borehole, the combination comprising transmitter and receiver coil means longitudinally spaced apart for movement through a borehole, means for passing a discontinuous half-wave sinusoidal pulse of direct current through said transmitter coil means to induce in said receiver coil means a signal having a conductive component of corresponding wave form dependent upon the conductivity of adjacent formations and a component in phase quadrature with said conductive component, means selectively responsive to said conductive component for producing a measure signal varying as a function of formation conductivity, and means for transmitting said measure signal to the surface for utilization.

6. In apparatus for investigating an electrical property of earth formations traversed by a borehole, the combination comprising transmitter and receiver coil means longitudinally spaced apart for movement through a borehole, means for passing discontinuous sinusoidal current wave train portions through said transmitter coil means at recurrent intervals to induce in said receiver coil means a signal having a conductive component dependent upon the conductivity of adjacent formations and a component in phase quadrature with the conductive component, each of said current wave train portions having a duration which is a relatively small fraction of the interval between current wave train portions, means responsive during the recurrence of said pulses selectively to said conductive component for producing a measure signal representing a function of formation conductivity, and means for transmitting said measure signal to the surface for utilization.

7. In apparatus for investigating an electrical property of earth formations traversed by a borehole, the combination comprising transmitter and receiver coil means longitudinally spaced apart for movement through a borehole, means for passing a discontinuous sinusoidal current wave train portion through said transmitter coil means to induce in said receiver coil means a signal having a conductive component dependent upon the conductivity of adjacent formations and a component in phase quadrature with the conductive component, means responsive to said induced signal during an interval when the average value of said quadrature component is substantially zero for producing a measure signal varying as a function of the conductive component of said induced signal, and means for transmitting said measure signal to the surface to provide a representation of variations in formation conductivity.

8. In apparatus for investigating an electrical property of earth formations traversed by a borehole, the combination comprising transmitter and receiver coil means spaced for longitudinal movement through a borehole, means for passing a discontinuous sinusoidal current wave train portion through said transmitter coil means to induce in said receiver coil means a signal having a conductive component dependent upon the conductivity of adjacent formations and a component in phase quadrature with the conductive component, means responsive to the transition of the potential developed across said transmitter coil means through a reference value for producing a gate signal having a relatively short duration compared with the interval between wave train portions, means responsive to said pulse signal during the occurrence of said gate signal for producing a measure signal varying as a function of formation conductivity, and means for transmitting said measure signal to the surface for utilization.

9. In apparatus for investigating an electrical property of earth formations traversed by a borehole, the combination comprising transmitter and receiver coil means longitudinally spaced apart for movement through a borehole, means for periodically passing a discontinuous half-wave sinusoidal pulse of direct current through said transmitter coil means to induce in said receiver coil means a signal having a conductive component dependent upon the conductivity of adjacent formations and a component in phase quadrature with the conductive component, means including a non-linear impedance responsive to the transition of the potential developed across said transmitter coil means through a reference value close to zero for producing a gate signal, amplifier means responsive to said induced signal and rendered operative by said gate signal for producing a measure signal varying primarily as a function of the conductive component of said induced signal, and means responsive to said measure signal for providing indications representative of formation conductivity.

10. In apparatus for investigating an electrical property of earth formations traversed by a borehole, the combination comprising transmitter and receiver coil means spaced for longitudinal movement through a borehole, means for passing a discontinuous half-wave sinusoidal pulse of direct current through said transmitter coil means to induce in said receiver coil means a signal having a conductive component dependent upon the conductivity of adjacent formations and a component in phase quadrature with the conductive component, means including a coil positioned in mutual inductive relation with said transmitter coil means for producing a gate signal occurring when the quadrature component of said induced signal is substantially zero, means responsive to said induced signal upon occurrence of said gate signal for producing a measure signal varying primarily as a function of the conductive component of said induced signal, and means responsive to said measure signal for producing indications which are a function of formation conductivity.

11. In apparatus for investigating an electrical property of earth formations traversed by a borehole, the combination comprising transmitter and receiver coil means longitudinally spaced apart for movement through a borehole, means for passing a discontinuous half-wave sinusoidal pulse of direct current through said transmitter coil means to induce in said receiver coil means a signal having a conductive component dependent upon the conductivity of adjacent formations and a component in phase quadrature with the conductive component, detecting means sensitized with reference to said current pulse and selectively responsive to the conductive component of said induced signal for producing a measure signal varying as a function of formation conductivity, and means responsive to said measure signal for providing a record thereof.

12. In apparatus for investigating an electrical property of earth formations traversed by a borehole, the combination comprising first and second transmitter and receiver coil means having different effective longitudinal spacings and arranged for movement through a borehole, means for passing a discontinuous sinusoidal current wave train portion through said transmitter coil means to induce in said receiver coil means first and second signals corresponding to said spacings, each of said induced signals having a conductive component dependent upon the conductivity of adjacent formations and a component in phase quadrature with the conductive component, means responsive selectively to the conductive component of said induced signals for producing corresponding measure signals each varying as a function of formation conductivity, and means responsive to said measure signals for providing corresponding indications of formation conductivity characterized by said spacings.

13. In apparatus for investigating an electrical property of earth formations traversed by a borehole, the combination comprising first and second transmitter coils and a receiver coil longitudinally spaced apart for movement through a borehole, said first transmitter coil having a relatively long spacing from said receiver coil and said second transmitter coil having a relatively short spacing from said receiver coil, means for passing a first discontinuous sinusoidal wave train pulse through said first transmitter coil to induce in said receiving coil a first signal having a conductive component dependent upon the conductivity of adjacent formations and a component in phase quadrature with the conductive component, means for passing a second discontinuous sinusoidal wave train pulse through said second transmitter coil to induce in said receiver coil a second signal having a conductive component dependent upon the conductivity of adjacent formations and a component in phase quadrature with the conductive component, detector means coupled with said receiver coil and sensitized with reference to said first current pulse for producing a first measure signal varying as a function of the conductive component of said first induced signal, detector means coupled with said receiver coil and sensitized with reference to said second current pulse for producing a second measure signal varying as a function of the conductive component of said second induced signal, and means responsive to said first and second measure signals for providing substantially simultaneous indications of formation conductivity characterized by said spacings.

14. In apparatus for investigating an electrical property of earth formations traversed by a borehole, the combination comprising first and second transmitter coils and a receiver coil having different effective longitudinal spacings for movement through a borehole, first and second pulse generators coupled with the respective transmitter coils for passing discontinuous sinusoidal wave train pulses therethrough, means for alternately energizing said pulse generators whereby said transmitter coils are alternately supplied with current pulses to induce in said receiver coil corresponding first and second signals each having a conductive component dependent upon the conductivity of adjacent formations and a component in phase quadrature with the conductive component, first and second phase sensitive detectors coupled with said receiver coil for response to said induced signals, means for supplying a reference signal from said first pulse generator to said first detector and from said second pulse generator to said second detector, and means coupled with the outputs of said detectors for providing indications of formation conductivity characterized by said spacings.

15. In apparatus for investigating an electrical property of earth formations traversed by a borehole, the combination comprising current carrying means arranged for movement through a borehole to emit energy into the adjacent formations, pulse generating means coupled with said current carrying means to supply a discontinuous sinusoidal current wave train portion thereto, said pulse generator including a capacitor arranged to be charged from a current source, a gaseous discharge device connected in series with said capacitor and poled to provide a discharge path from said capacitor, said discharge device having a control electrode for initiating a discharge, inductance means in said discharge path for producing series resonance, and an asymmetrically conductive device connected to form a charging circuit with said inductance and said capacitor and being poled to pass charging current to said capacitor.

References Cited in the file of this patent

UNITED STATES PATENTS

| | | |
|---|---|---|
| 2,370,692 | Shepherd | Mar. 6, 1945 |
| 2,582,314 | Doll | Jan. 15, 1952 |
| 2,582,315 | Doll | Jan. 15, 1952 |
| 2,723,375 | Schuster | Nov. 8, 1955 |
| 2,788,483 | Doll | Apr. 9, 1957 |